United States Patent
Moran et al.

[11] Patent Number: 5,902,016
[45] Date of Patent: May 11, 1999

[54] CHILD RESTRAINT HARNESS CLIP

[76] Inventors: Melissa A. Moran; Kevin P. Moran, both of 925 E. Lyon St., Milwaukee, Wis. 53202

[21] Appl. No.: 08/474,943

[22] Filed: Jun. 7, 1995

[51] Int. Cl.[6] .................................................. B60R 22/30
[52] U.S. Cl. .............................. 297/484; 24/170; 24/198; 24/308
[58] Field of Search ..................................... 297/483, 484; 280/808; 24/170, 198, 308, 309; 119/770

[56] References Cited

U.S. PATENT DOCUMENTS

| | | | |
|---|---|---|---|
| 4,592,592 | 6/1986 | Peek ..................................... | 297/484 X |
| 4,726,625 | 2/1988 | Bougher .............................. | 280/808 X |
| 4,786,078 | 11/1988 | Schrier et al. .......................... | 280/808 |
| 4,938,535 | 7/1990 | Condon et al. .......................... | 297/483 |
| 5,056,869 | 10/1991 | Morrison .............................. | 297/484 X |
| 5,088,161 | 2/1992 | Robertson ............................ | 297/483 X |
| 5,340,198 | 8/1994 | Murphy et al. ...................... | 280/808 X |
| 5,380,067 | 1/1995 | Turvill et al. ............................ | 297/484 |

FOREIGN PATENT DOCUMENTS 93021044  10/1993  WIPO .................................. 280/808

*Primary Examiner*—Peter R. Brown
*Attorney, Agent, or Firm*—Michael Best & Friedrich LLP

[57] ABSTRACT

A harness clip, for use on a child restraint system, which is easily slidable along the harness straps to facilitate positioning of the harness over a child's head, but which can be effectively secured into place relative to the straps when properly positioned near the child's chest. The clip generally comprises a base member for maintaining the two shoulder straps in lateral positioning relative to each other. In addition, the base member is movable relative to at least one of the shoulder straps. The clip further includes a securing device for releasably securing the base member to at least one of the two shoulder straps, to thereby inhibit relative sliding movement between the base member and at least one of the two straps. A method for securing a child in a child restraint system is also disclosed. The method generally comprises the steps of placing the child into the child restraint system, positioning the shoulder straps onto the child with the clip in a first position, moving the clip from the first position to a second position, and securing the clip to at least one of the shoulder straps to thereby substantially prevent relative movement between the clip and the shoulder strap.

3 Claims, 6 Drawing Sheets

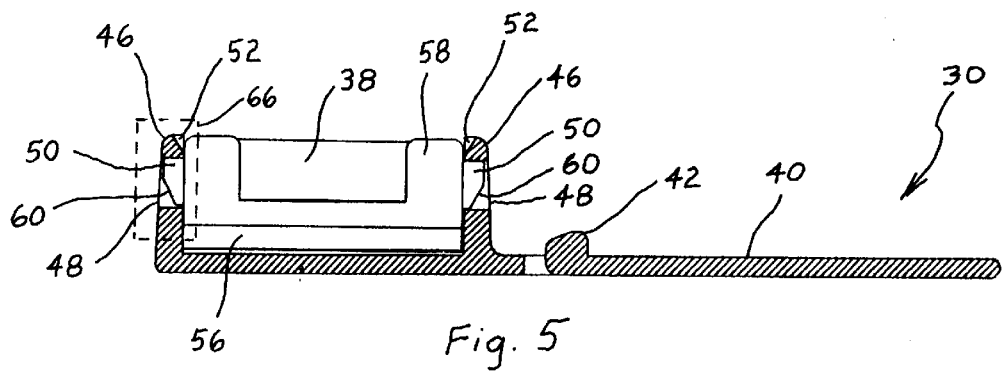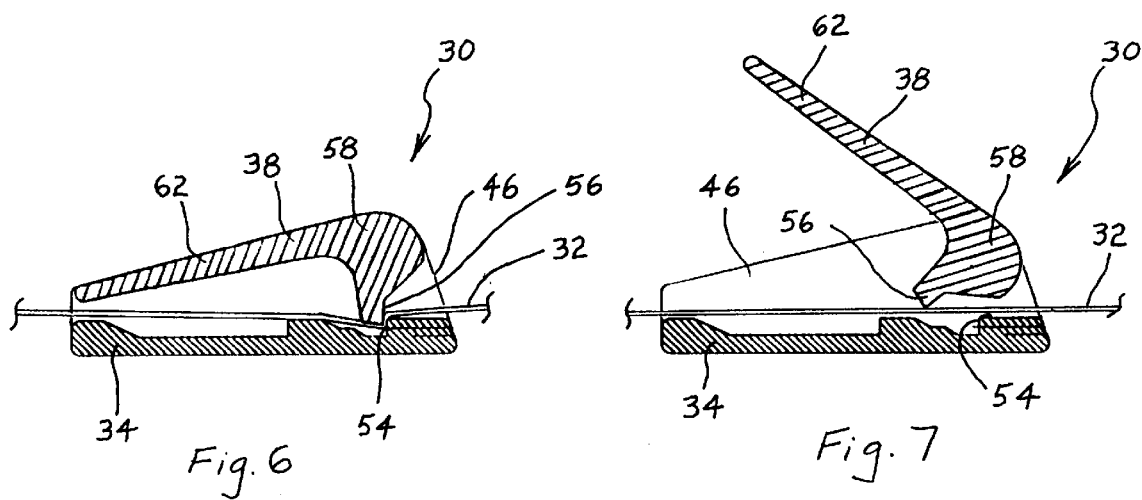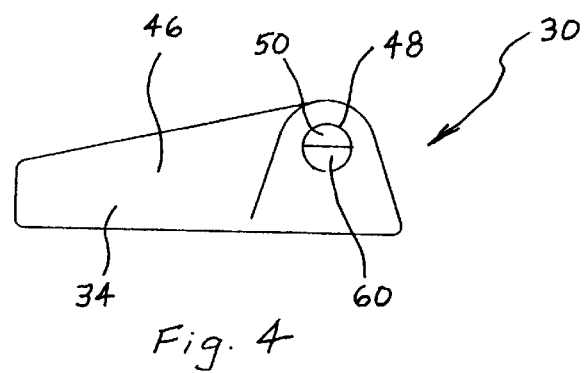

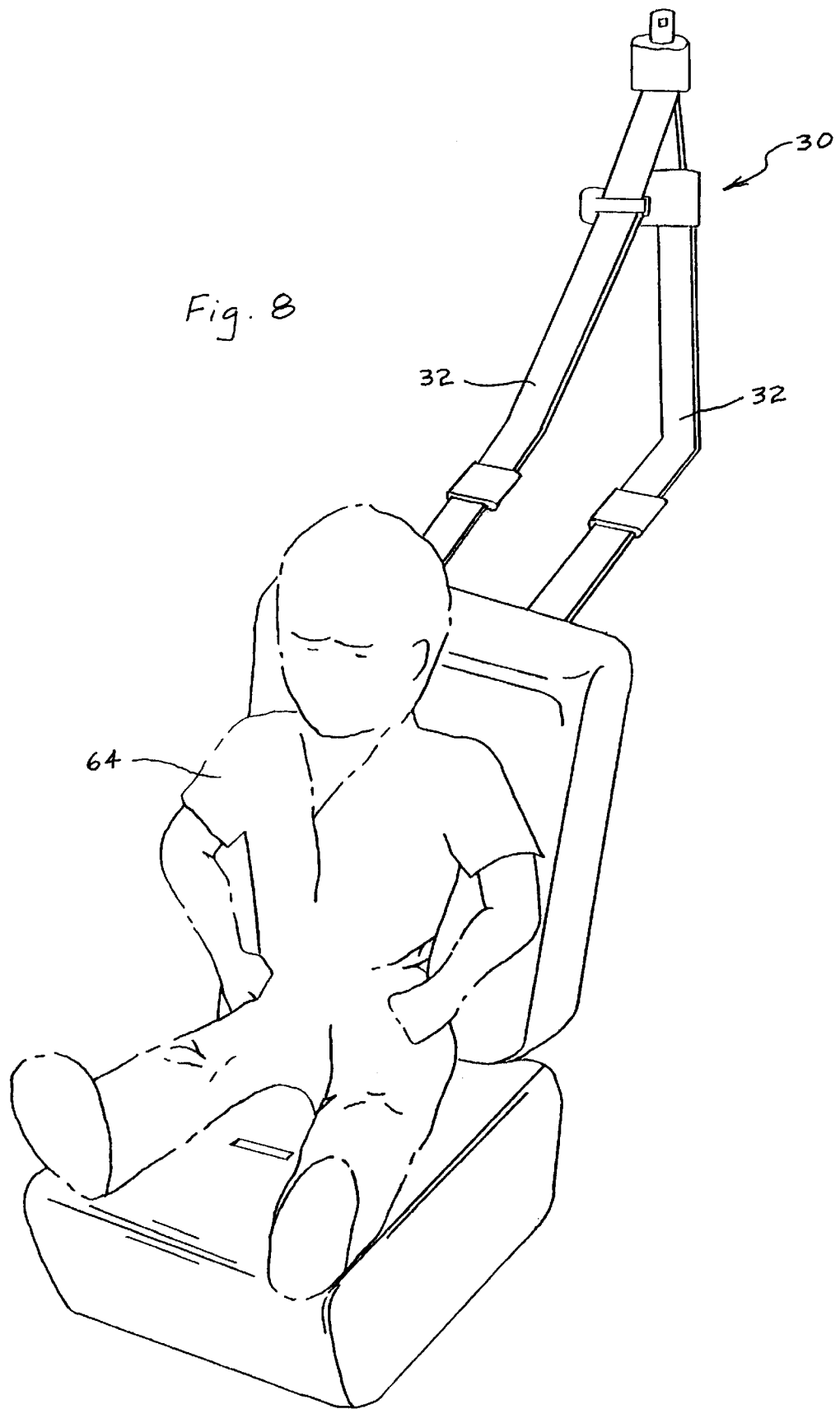

5,902,016

CHILD RESTRAINT HARNESS CLIP

FIELD OF THE INVENTION

The present invention generally relates to child vehicle restraints, such as child car seats having dual shoulder harnesses. More particularly, the present invention relates to child vehicle restraint harness clips designed to maintain dual shoulder harnesses properly positioned on a child's shoulders.

BACKGROUND OF THE INVENTION

It is well-known that many standard vehicle restraint systems do not adequately protect children from injury during vehicle collisions. For example, shoulder seat belts often do not adjust sufficiently to accommodate a child, sometimes resulting in the shoulder seat belt being dangerously positioned at the child's neck. To remedy this problem, supplemental child vehicle restraints, such as child car seats, have become an increasingly popular way of properly restraining children during vehicle collisions, thereby reducing injuries resulting therefrom.

Referring to FIG. 1, child car seats 20 typically incorporate a shoulder harness restraint, having two shoulder straps 22, to prevent the child 24 from being thrown around the vehicle during a collision. In use, the child 24 is typically positioned in the car seat 20 with the shoulder straps 22 in a raised position (i.e., above the child's head). The harness straps 22 are then positioned over the child's head, and the lower end of the harness straps 22 are secured to the base of the car seat 20, usually between the child's legs.

To properly maintain the position of the harness straps 22 on the child's shoulders, car seats 20 typically include a harness clip 26, as shown in FIG. 1. The clip 26 is designed to be slidable along the harness straps 22 to facilitate positioning of the harness straps 22 over the child's head. That is, the clip 26 can be slid to the lower end of the straps 22 (FIG. 1) while the harness straps 22 are being positioned over the child's head, and can be slid up to the child's chest to hold the straps 22 together (i.e., in relative lateral positioning) during use. Such positioning of the clip 26 also facilitates use of the car seat 20 for a range of child sizes by always allowing the clip 26 to be properly positioned on the child's chest.

Proper positioning of the clip 26 is important for safety to the child 24. If the clip 26 is positioned too low (FIG. 1), the harness straps 22 may slide off the child's shoulders and could result in the child 24 being thrown from the car seat 20 (i.e., between the harness straps 22) during sudden acceleration or deceleration of the vehicle. Further, with the clip 26 positioned too low, the child 24 may be tempted to crawl out of the car seat 20 through the harness straps 22, resulting in an obviously unsafe condition. With the clip 26 positioned too high, the clip 26 can be uncomfortably positioned around the child's neck, and may dangerously restrict the child's breathing.

Sometimes a properly positioned clip 26 can slide from a proper position to an improper position. For example, the clip 26 may slide down the harness straps 22 due to gravitational forces of the clip 22 itself and/or due to vibration from the vehicle. Also, the child's movements may cause the clip 26 to slide down the harness straps 22. In addition, the child herself may intentionally slide the clip 26 down to make the harness straps 22 more comfortable.

SUMMARY OF THE INVENTION

The present invention provides a harness clip which is easily movable relative to at least one of the harness straps to facilitate positioning of the harness over a child's head, but which can be effectively secured into place relative to the strap when properly positioned near the child's chest. The clip of the present invention is particularly suitable for use with child restraint systems which utilize at least two shoulder straps.

The clip generally comprises a base member for maintaining the two shoulder straps in lateral positioning relative to each other. In addition, the base member is movable relative to at least one of the shoulder straps. The clip further includes a securing device for releasably securing the base member to at least one of the two shoulder straps, to thereby inhibit relative sliding movement between the base member and at least one of the two straps. Once the clip is properly positioned and secured relative to the shoulder straps, it will stay in that position, thereby maintaining the shoulder straps in their proper orientation on the child. That is, the clip is substantially prevented from being moved by a child.

In one embodiment, the base member includes means for slidably receiving at least one of the two shoulder straps. For example, the clip may include at least one slot, and preferably includes two slots. In addition, the slot may be an open ended slot to facilitate removal of at least one of the two shoulder straps from the slot.

In another embodiment, the securing device comprises an engagement member attached to the base member. The engagement member may be movable relative to the base member between an engaged position, to allow engagement of the base member to at least one of the shoulder straps, and a disengaged position, to allow disengagement of the base member from at least one of the shoulder straps. For example, the engagement member may be pivotally attached to the base member, and preferably comprises a cam buckle. In yet another embodiment, the securing device further comprises a biasing means (e.g., a spring) for biasing the engagement member toward the engaged position.

In another aspect of the present invention, a method for securing a child in a child restraint system is provided. The method is particularly applicable to child restraint systems having at least two shoulder straps and a child restraint clip for maintaining the two shoulder straps of the child restraint system in lateral positioning relative to each other. The child restraint clip may, for example, be movable between a first position, to facilitate positioning of the shoulder straps onto the child, and a second position, to maintain the shoulder straps in lateral positioning relative to each other. The method generally comprises the steps of placing the child into the child restraint system, positioning the shoulder straps onto the child with the clip in the first position, moving the clip from the first position to the second position, and securing the clip to at least one of the shoulder straps to thereby substantially prevent relative movement between the clip and the shoulder strap.

In one embodiment, the method is performed utilizing a clip having an engagement member pivotally attached thereto. In this embodiment, the step of securing the clip comprises pivoting the engagement member relative to the clip to thereby secure the clip to at least one of the shoulder straps. In another embodiment, the method is performed utilizing a clip which is slidable relative to at least one the shoulder straps. In this embodiment, the step of moving the clip comprises sliding the clip relative to at least one shoulder strap.

BRIEF DESCRIPTION OF THE DRAWINGS

FIG. 4 is a side view of the harness clip illustrated in FIG. 2 with the engagement member in the locked position.

FIG. 5 is a section view taken along line 5—5 in FIG. 2 with the engagement member in the locked position, the engagement member not being shown in section.

FIG. 6 is a section view taken along line 6—6 in FIG. 2 with the engagement member in an unlocked position.

FIG. 7 is the section view of FIG. 6 with the engagement member in a locked position.

FIG. 8 is a perspective view of a child vehicle restraint embodying aspects of the present invention showing a harness positioned above the child's head with the harness clip illustrated in FIGS. 2–7 in a first position relative to the harness.

DETAILED DESCRIPTION

Figure 1:
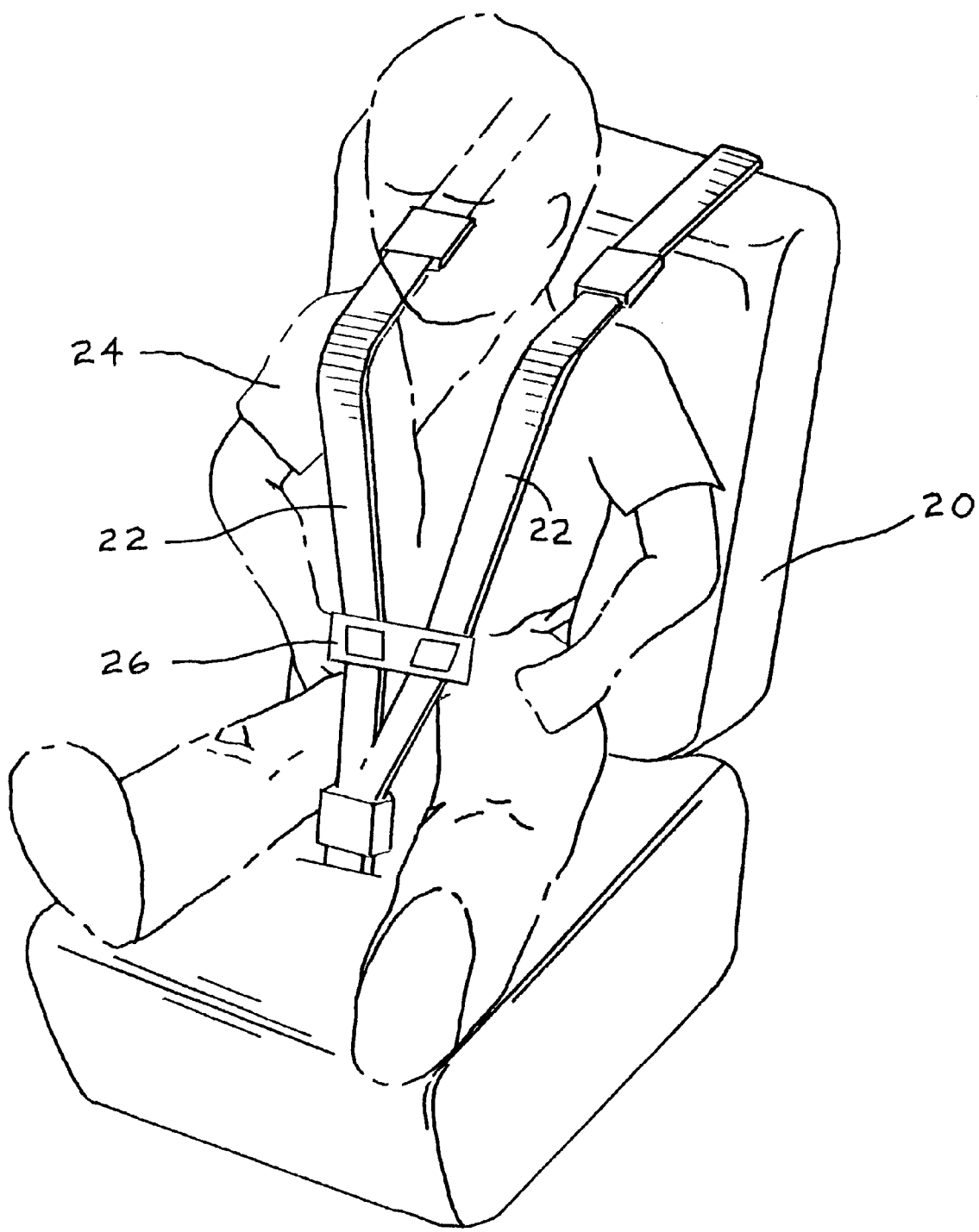
FIG. 1 is a perspective view of a child vehicle restraint utilizing a prior art harness clip.
Figure 3:
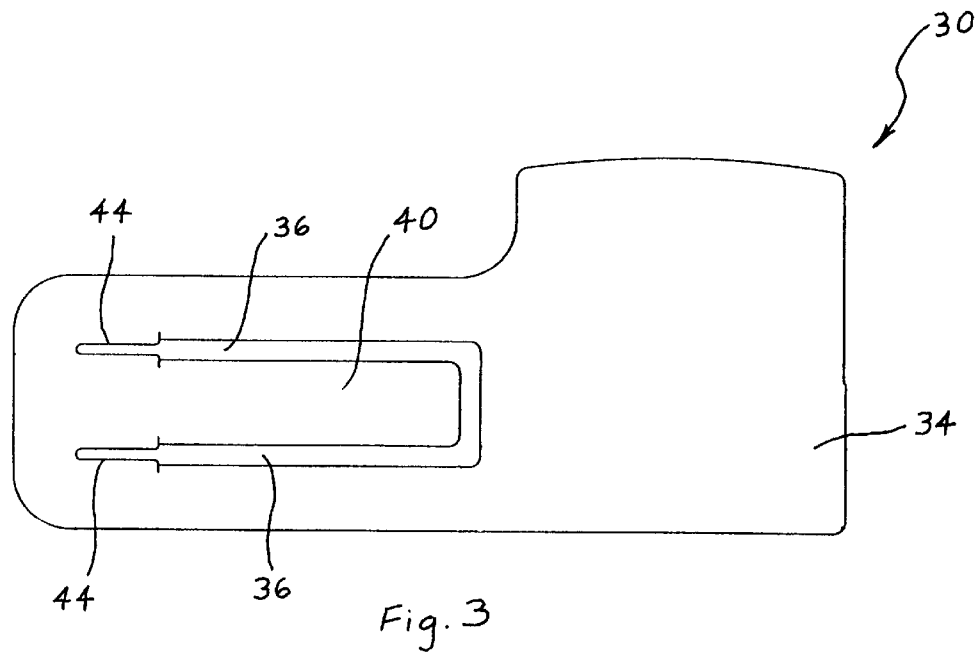
FIG. 3 is a bottom view of the harness clip illustrated in FIG. 2.
Figure 2:
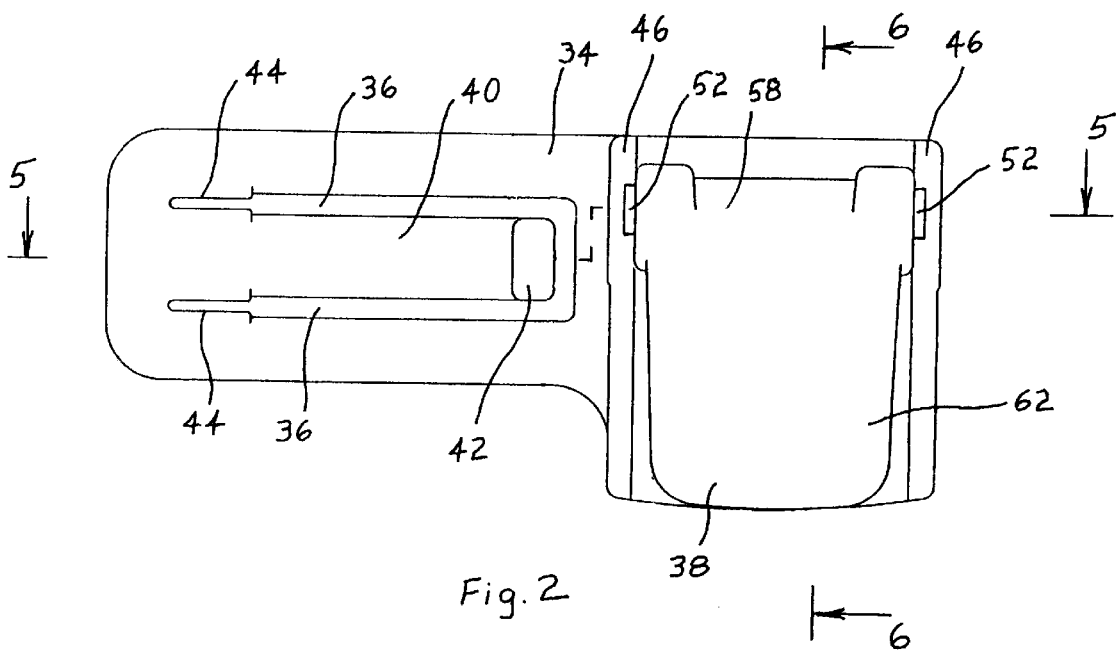
FIG. 2 is a top view of a harness clip embodying aspects the present invention with an engagement member in a locked position.

One embodiment of the present invention is illustrated in FIGS. 2–7. The illustrated device is a harness clip 30 which incorporates a cam buckle for allowing selective securement of the harness clip 30 to a shoulder strap 32 of a child restraint system. The clip 30 generally comprises a base member 34 having two slots 36 formed therein for slidably receiving a shoulder strap 32, and an engagement member 38 pivotably secured to the base member 34. As will be more apparent from the description herein, a shoulder strap 32 is positionable between the engagement member 38 and the base member 34, and the engagement member 38 is pivotable relative to the base member 34 between locked and unlocked positions to selectively secure the base member 34 relative to the shoulder strap 32.

The base member 34 of the illustrated embodiment is formed from a relatively rigid plastic material such as DELRIN, a trademark of DuPont. The two slots 36 in the base member 34 are wide enough to accommodate a shoulder strap 32 of a child restraint system. For example, the slots 36 of the illustrated embodiment are designed to be used with 1½ inch wide straps, and the effective width of the slots 36 is about 2 inches. The two slots 36 are joined to each other on one end such that the slots 36 are open-ended and form a tongue portion 40. The slots 36 are designed such that a shoulder strap 32 can be threaded through the slots 36 and over the top of the tongue portion 40. Such positioning of the strap 32 can be accomplished by bending the tongue portion 40 downward and looping the strap 32 over the tongue portion 40. The tongue portion 40 includes a raised lip 42 on its end for inhibiting the strap 32 from sliding off of the tongue portion 40. The slots 36 each include a narrow portion 44 for providing slight resistance to the sliding of the shoulder strap 32 through the slots 36.

Two flange portions 46 extend upwardly from the top of the base member 34 to provided a means for pivotably securing the engagement member 38 to the base member 34. In this regard, the flange portions 46 each include holes 48 therethrough for insertably receiving shafts 50 of the engagement member 38, as will be described below in more detail. The flange portions 46 further include ramped portions 52 for facilitating insertion of the shafts 50 of the engagement member 38 into the holes 48. The base member 34 further includes a ledge portion 54 in a top surface thereof for facilitating securement of the shoulder strap 32 between the ledge portion 54 and a cam finger 56 of the engagement member 38, as is described below in more detail.

The engagement member 38 is also made from a rigid plastic, such as DELRIN. The engagement member 38 includes a body portion 58 having two shafts 50 extending from opposing ends thereof. The width of the body portion 58 and the diameters of the shafts 50 are dimensioned such that the shafts 50 fit into the holes of the base member 34 and the engagement member 38 is pivotable relative to the base member 34. The ends of the shafts 50 include a tapered surface 60 to facilitate insertion of the shafts into the holes 48 of the base member 34.

The cam finger 56 extends from the body portion 58 and is dimensioned such that, when the engagement member 38 is rotated to the locked position, the cam finger 56 will be rotated toward the ledge portion 54 of the base member 34 to pinch the shoulder strap 32 therebetween, as illustrated in FIG. 6. I addition, the cam finger 56 may be rotated to the unlocked position to thereby allow the shoulder straps 32 to slide therethrough, as illustrated in FIG. 7.

A lever portion 62 extends from the body portion 58 of the engagement member 38. The lever portion 62 provides the mechanical advantage required to rotate the cam finger 56 between the unlocked and locked positions, and vice versa. In addition, a spring 66 can be used to bias the engagement member 38 toward the locked position.

Figure 9:
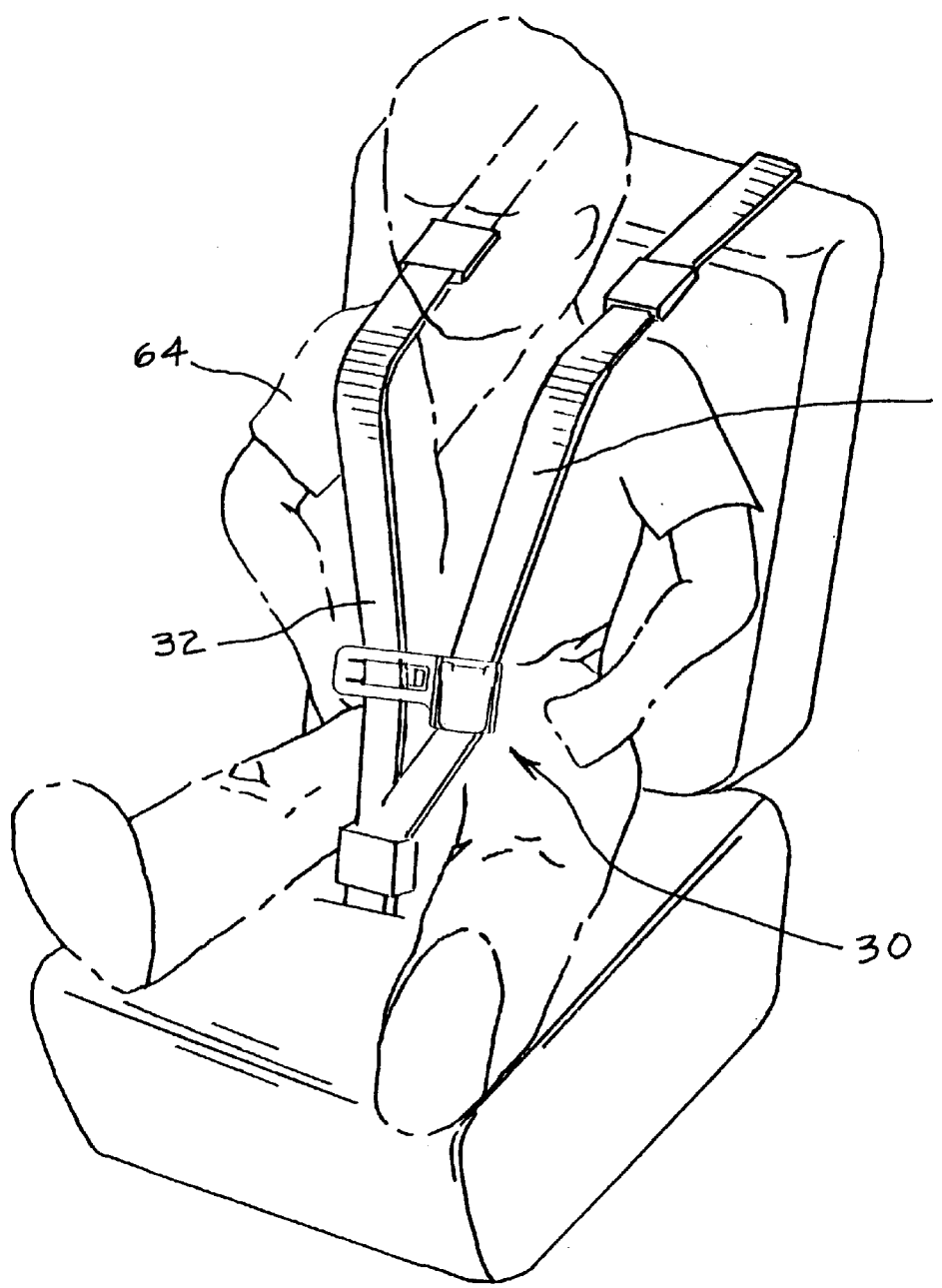
FIG. 9 is the perspective view of FIG. 8 showing the harness secured between the child's legs with the harness clip in the first position.
Figure 10:
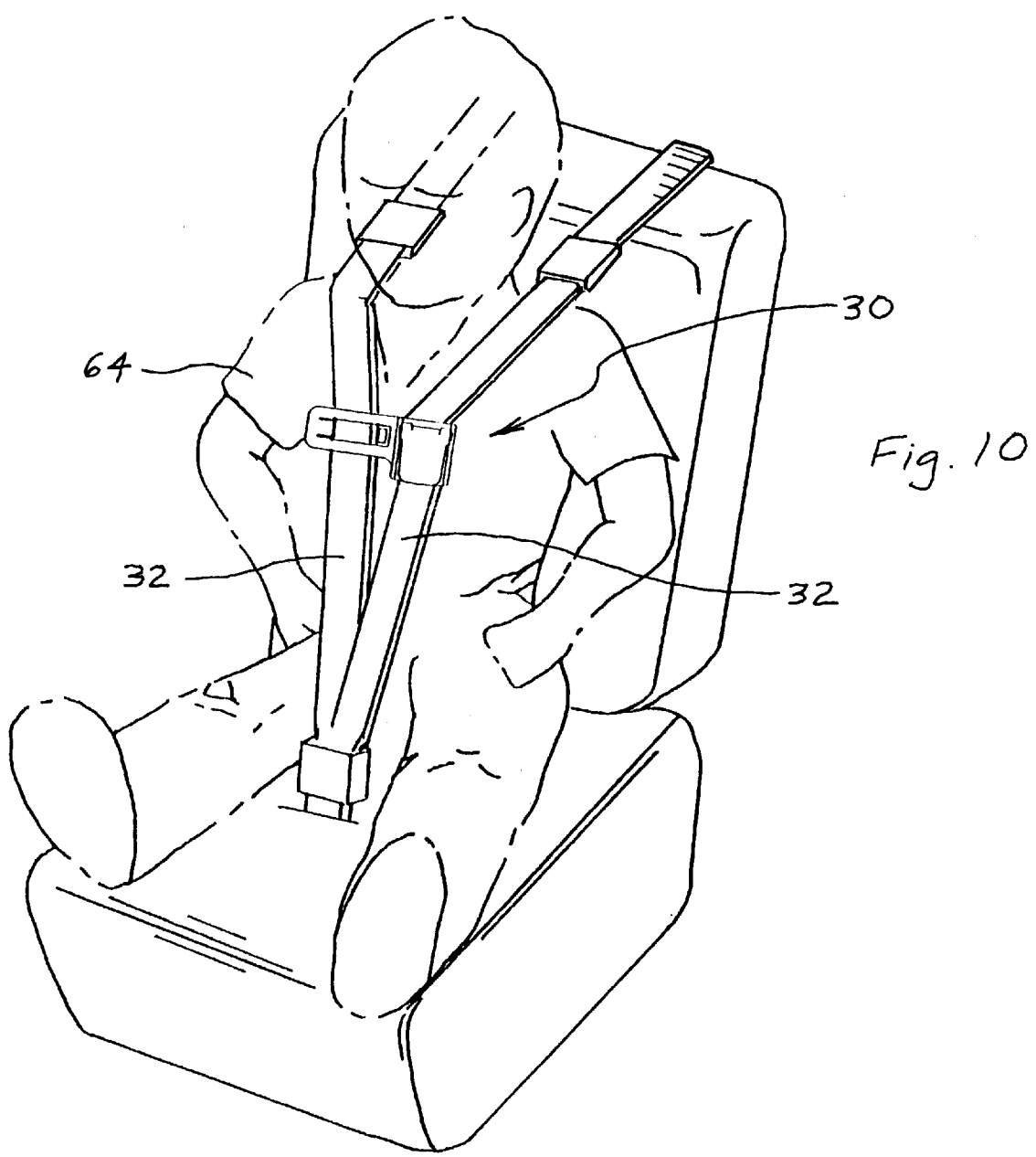
FIG. 10 is the perspective view of FIG. 8 showing the harness secured between the child's legs with the harness clip in a second position relative to the harness.

When the clip 30 is in the unlocked position, it may be positioned relative to the straps 32 to facilitate loading of a child 64 into a child restraint system. For example, referring to FIGS. 8–10, a method of using the clip 30 in conjunction with a child restraint system may include the steps of placing a child 64 into the child restraint system (FIG. 8), positioning the shoulder straps 32 onto the child 64 with the clip 30 in a first position (FIG. 9), moving the clip 30 from the first position to a second position (FIG. 10), and securing the clip 30 to at least one of the shoulder straps 32 to thereby substantially prevent relative movement between the clip 30 and the shoulder strap 32. When the clip 30 is used with a system wherein the shoulder straps 32 are to be positioned over the child's head, the clip 30 will likely be positioned on a lower end of the straps 32 while such positioning occurs, and will be moved upward during the step of moving the clip 30. The second position of the clip 30 preferably corresponds with the clip 30 being positioned on the child's chest.

In the illustrated embodiment, the step of securing the clip 30 to the shoulder strap 32 includes rotating the engagement member 38 from an unlocked position (FIG. 7) to a locked position (FIG. 6). In addition, when utilizing the illustrated clip 30, the step of moving the clip 30 preferably includes sliding the clip 30 relative to the shoulder strap 32.

The foregoing description of the present invention has been presented for purposes of illustration and description of a single embodiment of the invention. Furthermore, the description is not intended to limit the present invention to the form disclosed herein. Consequently, variations and modifications of the present invention which are commensurate with the above teachings to those having skill or knowledge of the relevant art, are also within the scope of the present invention. For instance, various other means for securing the clip 30 to a strap 32 may be provided, such as by a biased clamp. The embodiments described hereinabove are further intended to explain best modes known of practicing the invention to enable others skilled in the art to utilize the invention in such or other embodiments and with the various modifications required by their particular applications or uses of the present invention. It is intended that the appended claims be construed to include alternative embodiments to the extent permitted by the prior art.

What is claimed is:

1. A method for securing a child in a child restraint system, the child restraint system including at least two shoulder straps and a child restraint clip for maintaining the two shoulder straps of the child restraint system in lateral positioning relative to each other, the child restraint clip including s securing device for selectively securing the clip to at least one of the two shoulder straps, the child restraint clip being movable between a first position, to facilitate positioning of the shoulder straps onto the child, and a second position, to maintain the shoulder straps in lateral positioning relative to each other, said method comprising the steps of:

placing the child into the child restraint system;

positioning the shoulder straps onto the child with the clip in the first position;

moving the clip relative to the shoulder straps from the first position to the second position while maintaining sliding engagement with at least one of said shoulder straps; and actuating the securing device to secure the clip to at least one of the shoulder straps to thereby maintain the clip in the second position and substantially prevent relative movement between the clip and the shoulder strap.

2. A method for securing a child, as claimed in claim 1, wherein said securing device includes an engagement member pivotally attached to the clip, and wherein said step of actuating the securing device comprises:

pivoting the engagement member relative to the clip to thereby secure the clip to at least one of the shoulder straps.

3. A method for securing a child, as claimed in claim 1, wherein the clip is slidable relative to at least one of the shoulder straps, and wherein said step of moving the clip comprises:

sliding the clip relative to the shoulder strap.

\* \* \* \* \*